Aug. 24, 1948. D. R. BATES 2,447,554
FISHHOOK EXTRACTOR
Filed May 15, 1946

Dorr R. Bates INVENTOR.

BY Samuel H. Davis

Patented Aug. 24, 1948

2,447,554

UNITED STATES PATENT OFFICE 2,447,554

FISHHOOK EXTRACTOR

Dorr R. Bates, Lansing, Mich.

Application May 15, 1946, Serial No. 669,883

1 Claim. (Cl. 43—29)

This invention relates to fishing tackle and is particularly concerned with a device for the extraction of a fish hook imbedded in the flesh of the oral cavity of a fish.

In the prior art there is no satisfactory means for the extraction of a fish hook from the oral cavity of a fish as the imbedding of the said hook occurs in the normal procedure of fishing. Very frequently the hook is imbedded so deeply in the oral cavity of the fish that to remove the same without damage to the fishing tackle resort is had to mutilating a portion of the body of the fish. Such a procedure is not only wasteful of the fish as a food commodity but it is disliked by the fisherman because a mutilated fish diminishes the value of the catch. Frequently, in an attempt to remove a hook which has been deeply imbedded in the flesh of the oral cavity of the fish, the fisherman will insert his finger therein and may cause serious injury to the same. A device for the removal of an imbedded hook as above described has been a dream of most fishermen, yet no device suitable for such use has been found.

It is therefore an object of this invention to provide a device for the extraction of a fish hook which has been imbedded in the flesh of the oral cavity of a fish. It is a further object to provide such a device whereby the fish hook can be removed with relative ease to the fisherman. It is still a further object to provide a device for the removal of a fish hook from the oral cavity of a fish without causing injury to the fisherman and without the necessity of mutilating any portion of the body of the fish.

I have now found that I am able to avoid the disadvantages encountered in the prior art and am able to accomplish the objects set forth and have accordingly discovered and invented a simple but novel device whereby I am able readily to extract a fish hook from the oral cavity of a fish no matter how deeply the said hook has been imbedded in the flesh of the said oral cavity.

In the accompanying drawings I have illustrated my invention which together with the following description discloses fully and clearly the full nature and novelty of the same.

Figure 2:
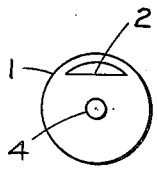
Fig. 2 is a left side view of the same.
Figure 1:
Fig. 1 is a front view of the device of my invention.
Figure 3:
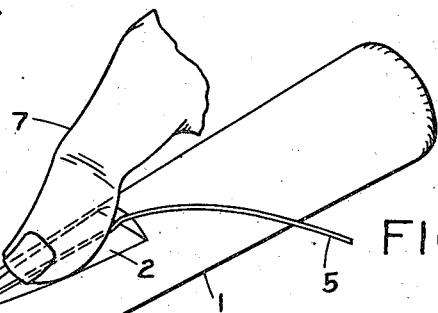
Fig. 3 is an isometric drawing of the device showing the position of the device in respect to the thumb of the fisherman, the fish line, and the fish hook. The fish is not shown.
Figure 4:
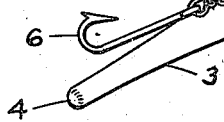
Fig. 4 is an isometric drawing of the device of my invention showing the position of the hook and the line in respect to the thumb of the fisherman after a quarter counter-clockwise turn of the device or a quarter clockwise turn of the body of the fish is made. The fish is not shown.
Figure 4:
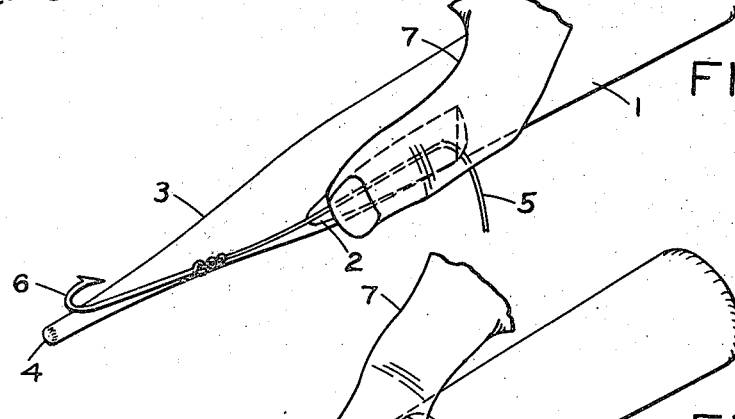
Figure 5:
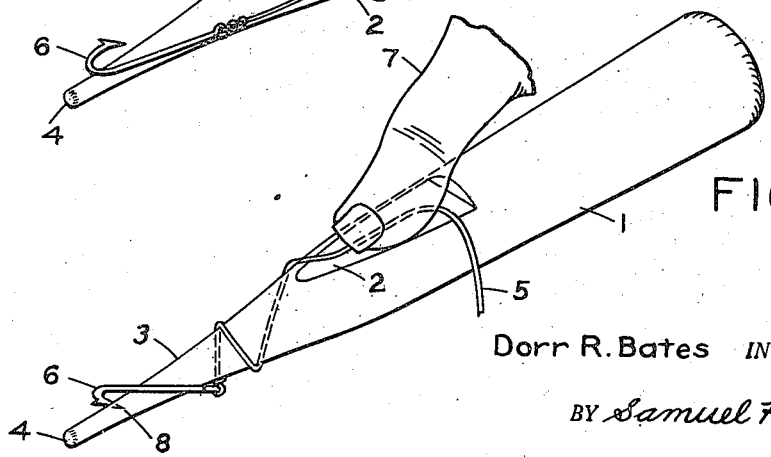
Fig. 5 is an isometric drawing of the device showing the position of the hook and the line in respect to the thumb of the fisherman after two counter-clockwise turns of the device or two clockwise turns of the body of the fish are made.

In Figs. 1 and 2, the device 1 is shown with a flat notch 2 which is cut away from the device and a taper 3 with a blunt point 4. The Figs. 3, 4, and 5 show the device 1 in isometric drawings with the notch 2, taper 3, and the blunt point 4. In Figs. 3, 4, and 5 there is shown the fish line 5, the fish hook 6, and the fisherman's thumb 7.

In operation the fish hook extractor 1 is inserted into the oral cavity of the fish and a portion of the line 5 is securely held by pressing the thumb 7 over the said line and the notch 2, and the device is turned counter-clockwise to cause the line 5 to be wound around the taper 3 of the device. When the portion of the line extending from the hook to a point at which it is held against the notch 2 by the fisherman's thumb is entirely wound around the taper 3 the hook is pulled transversely away from the flesh of the walls of the oral cavity and is pulled toward the taper of the device. When the hook is entirely released from the flesh of the fish a slight counter-clockwise turn will cause it to be imbedded in the taper portion of the device at approximately point 8.

The above operation is described by turning the device of my invention in a counter-clockwise direction. The body of the fish (not shown) is held with one hand during this operation to prevent the body of the fish from turning. When it is more convenient to turn the fish instead of the device in the above-described operation for the extracting of the fish hook, the device is then held securely to prevent turning and the body of the fish is turned in a clockwise direction.

The device of my invention may be readily constructed without the need of special tools as it is most suitable for the intended purpose when the same is constructed from wood. When it is thus constructed from wood the penetration of the hook into the device is readily accomplished and eliminates the possibility of the fisherman's injury by the hook.

While I prefer the construction of my device from wood I wish to point out that I do not wish to be limited to the use of the same as I am equally able to use other materials, such as various plastic compounds, and am able thus to construct the device of my invention.

I wish also to point out that I am not limited in the scope of this invention by the particular design of the device as shown herein. For example, although I find that the notch portion of my device is convenient for holding a portion of the fish line by pressing the thumb against the line and the said notched portion, I do not wish to be limited to such a notch because I am also able to perform the extraction of the hook with a different shaped notch or, although less conveniently, without such a notch.

I claim:

A fish hook extractor, comprising a solid wooden cylindrical portion, a solid wooden tapered portion having a blunt end, the said tapered portion being integral with the said cylindrical portion and extending in one direction therefrom, the said tapered portion adapted for imbedding a point of a fish hook thereinto, and a notch in the said cylindrical portion adapted for resting the thumb to securely hold a portion of a fish line.

DORR R. BATES.

REFERENCES CITED

The following references are of record in the file of this patent:

UNITED STATES PATENTS

| Number | Name | Date |
| --- | --- | --- |
| 2,155,898 | Harkins | Apr. 25, 1939 |
| 2,164,907 | Falkner | July 4, 1939 |